(12) United States Patent
Park

(10) Patent No.: US 8,688,882 B2
(45) Date of Patent: Apr. 1, 2014

(54) SYSTEMS ON CHIPS HAVING INTERRUPT PROXY FUNCTIONS AND INTERRUPT PROCESSING METHODS THEREOF

(75) Inventor: Jinyoung Park, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 328 days.

(21) Appl. No.: 12/951,161

(22) Filed: Nov. 22, 2010

(65) Prior Publication Data

US 2011/0208888 A1    Aug. 25, 2011

(30) Foreign Application Priority Data

Feb. 25, 2010  (KR) .................. 10-2010-0017294

(51) Int. Cl.
*G06F 13/24* (2006.01)

(52) U.S. Cl.
USPC .......................................... 710/260; 710/267

(58) Field of Classification Search
USPC ................................................. 710/260, 267
See application file for complete search history.

(56) References Cited

U.S. PATENT DOCUMENTS

| | | | | |
|---|---|---|---|---|
| 5,428,799 | A * | 6/1995 | Woods et al. ................. | 710/266 |
| 6,711,643 | B2 | 3/2004 | Park et al. | |
| 7,496,706 | B2 * | 2/2009 | Nguyen et al. ............... | 710/269 |
| 7,805,555 | B2 * | 9/2010 | Takata et al. ................. | 710/260 |
| 7,934,033 | B2 * | 4/2011 | Malwankar et al. .......... | 710/104 |
| 7,962,771 | B2 * | 6/2011 | Song et al. .................... | 713/300 |
| 7,984,218 | B2 * | 7/2011 | Suzuki .......................... | 710/267 |
| 8,255,577 | B2 * | 8/2012 | Muppirala et al. ............... | 710/5 |
| 2001/0037426 | A1 * | 11/2001 | Pawlowski et al. ........... | 710/260 |
| 2003/0101301 | A1 * | 5/2003 | Taniguchi ..................... | 710/260 |
| 2003/0110336 | A1 | 6/2003 | Park et al. | |
| 2005/0102457 | A1 * | 5/2005 | Stultz ............................ | 710/260 |
| 2007/0090401 | A1 * | 4/2007 | Baumann et al. ............. | 257/203 |
| 2008/0082710 | A1 * | 4/2008 | Nijhawan et al. ............. | 710/260 |
| 2008/0168203 | A1 | 7/2008 | Moorkanikara Nageswaran et al. | |
| 2008/0184193 | A1 * | 7/2008 | Devins et al. ................. | 717/104 |
| 2010/0274879 | A1 * | 10/2010 | Wolfe ............................ | 709/223 |

FOREIGN PATENT DOCUMENTS

| | | |
|---|---|---|
| JP | 2001-325208 | 11/2001 |
| JP | 2008-532167 | 8/2008 |
| KR | 10-0456630 | 11/2004 |
| WO | WO 2006/090329 | 8/2006 |

* cited by examiner

*Primary Examiner* — Paul R Myers
*Assistant Examiner* — Christopher A Daley
(74) *Attorney, Agent, or Firm* — Harness, Dickey & Pierce, P.L.C.

(57) ABSTRACT

Provided is a system on chip (SoC) capable of rapidly processing interrupts generated in various modules without causing an error. The SoC includes a processor configured to process a task, a plurality of modules on the SoC and operationally coupled to the processor through a system bus, and an interrupt proxy processing unit operationally coupled to the processor and the plurality of modules and configured to solely process an interrupt-related task from a first module of the plurality of modules.

13 Claims, 3 Drawing Sheets

SYSTEMS ON CHIPS HAVING INTERRUPT PROXY FUNCTIONS AND INTERRUPT PROCESSING METHODS THEREOF

CROSS-REFERENCE TO RELATED APPLICATIONS

This U.S. non-provisional patent application claims priority under 35 U.S.C. §119 to Korean Patent Application No. 10-2010-0017294, filed on Feb. 25, 2010, the entire contents of which are hereby incorporated by reference.

BACKGROUND

The present disclosure herein relates to a system on chip, and more particularly, to a system on chip having an interrupt proxy function and an interrupt processing method thereof.

A variety of information devices used in digital communication systems or multimedia systems are being reduced in size, weight and price while improved in performance according to users' demands. Consequently, a system on chip (SoC) technology is becoming more significant.

The SoC is a semiconductor integration circuit in which functions of various semiconductor products having separate markets and product groups, such as a processor, a memory, an analog circuit, and a digital signal processor (DSP), are integrated on one chip. Therefore, the SoC includes a plurality of modularized intellectual properties (IPs). The IPs include all hardware and software functions constituting a system, such as a memory, an external interface, analog and hybrid mode blocks, built-in software, and an operating system (OS). The IP may be referred to as a virtual component (VC) in the field of the art.

When interrupt signals are generated in the respective IPs of the SoC, a processor core collects all the interrupt signals generated in the IPs and processes interrupt tasks using different user software according to the IPs.

In this case, since different IPs may take different times in processing the interrupt tasks, the overall performance of the SoC may be deteriorated. Also, the system may malfunction due to an error occurring in the user software. In case that a system structure is complicated due to an increase of IPs, a waiting time may increase due to a difference in time for the processor core to make access to the respective IPs. When the interrupt task processing is thus delayed, an error may occur in which the high-speed processor core performs an interrupt service routine of the user software again.

SUMMARY

The present disclosure provides a system on chip (SoC) capable of rapidly processing interrupts generated in each intellectual property (IP) without causing errors, and a method for processing interrupts thereof.

The present disclosure also provides an SoC having an interrupt proxy function capable of processing interrupts in a standardized manner, and an interrupt processing method thereof.

The present disclosure also provides an improved method capable of preventing occurrence of an error in which a process core performs an interrupt service routine again.

The present disclosure also provides an SoC capable of securing a uniform interrupt task processing time regardless of which IP the interrupt is generated in and also capable of preventing occurrence of an error although a wrong user software exists by a user's mistake, and an interrupt processing method thereof.

The present disclosure also provides an SoC having an interrupt proxy function capable of improving the performance and the operational stability, and an interrupt processing method thereof.

Example embodiments of inventive concepts provide system on chips (SoC) including a processor configured to process a set task, a system bus, a plurality of modules operationally coupled with the processor through the system bus, and an interrupt proxy processing unit connected to the processor and the plurality of modules and configured to solely process an interrupt-related task associated with a first module of the plurality of modules.

In some embodiments, the interrupt proxy processing unit is configured to release an interrupt from a first module of the plurality of modules as part of the interrupt-related task.

In other embodiments, the interrupt proxy processing unit may include a status register configured to store interrupt status information regarding an interrupt received from the first module and store an interrupt release signal from the processor when the processor releases the interrupt, a bus interface configured to supply the interrupt release signal to the first module, and a priority determination unit between the status register and the processor and configured to select information having a highest interrupt priority among the interrupt status information and supply the selected information to the processor.

In at least some embodiments, the processor may not be configured to directly supply the interrupts release signal to the first module.

In still other embodiments, the status register may include a first storage region configured to store the interrupt status information, a second storage region configured to store the interrupt release signal, and a third storage region configured to store transmission execution information regarding the interrupt status information.

In even other embodiments, the bus interface is a bus slave interface with respect to the processor and is a bus master interface with respect to the plurality of modules.

In other embodiments of inventive concepts, an SoC may include a processor configured to process a task, a system bus, a plurality of modules operationally coupled with the processor through the system bus, and an interrupt proxy processing unit connected to the processor and the plurality of modules and configured to receive an interrupt from a first module of the plurality of modules, store interrupt status information, and solely process an interrupt release task with respect to the first module.

In some embodiments, the plurality of modules includes at least one selected from the group consisting of a memory, a logic circuit, an analog circuit, and a digital signal processor (DSP).

In other embodiments, the interrupt proxy processing unit may include a status register adapted to store the interrupt status information and to when an interrupt is released by the processor, store interrupt release signal received from the processor, a bus interface configured to supply the interrupt release signal to the first module, and a priority determination unit located between the status register and the processor and configured to select information having a highest interrupt priority among the interrupt status information and supply the selected information to the processor.

In at least some embodiments, the processor may not be configured to directly supply the interrupt release signal to the first module.

In still other embodiments, the status register may include a first storage region configured to store the interrupt status information, a second storage region configured to store the interrupt release signal, and a third storage region configured to store transmission execution information regarding the interrupt status information.

In still other embodiments of inventive concepts, there are provided methods for processing interrupts in an SoC which includes a plurality of modules installed in the form of a module and operationally associated with a processor through a system bus. The methods include storing interrupt status information generated from the plurality of modules in an interrupt proxy processing unit that operates as a slave interface with respect to the processor, and releasing an interrupt through the interrupt proxy processing unit so that, when the processor escapes an interrupt processing operation mode, an operation of checking release of the interrupt is skipped.

In some embodiments, the interrupt proxy processing unit may receive from the processor an interrupt clear command with respect to a corresponding module among the plurality of modules before the releasing of the interrupt.

In other embodiments, the interrupt status information and the interrupt clear command may be stored in a status register of the interrupt proxy processing unit.

In still other embodiments, the interrupt status information may be stored in a first storage region of the status register, and the interrupt clear command is stored in a second storage region of the status register.

In even other embodiments, the status register may further include a third storage region to store transmission execution information regarding the interrupt status information.

In yet other embodiments, the transmission execution information may be stored when selected as information having a highest interrupt priority among the interrupt status information.

In even other embodiments of inventive concepts, SoCs may include a processor configured to process a task, a system bus, a plurality of modules including hardware, peripheral devices, and interfaces, and operationally coupled to the processor through the system bus, and an interrupt proxy processing unit operationally coupled to the plurality of modules and configured to operate as another module with respect to the processor, receive an interrupt from a first module of the plurality of modules, store interrupt status information, and solely release the interrupt with respect to the first module upon receiving an interrupt clear command from the processor.

In at least some embodiments, the processor may not be configured to directly supply the interrupt clear command to the first module.

In some embodiments, the plurality of modules may include at least one selected from the group consisting of a memory, a logic circuit, an analog circuit, and a DSP.

In other embodiments, the interrupt proxy processing unit may include a status register configured to store the interrupt status information regarding the interrupt and store the interrupt clear command, the interrupt clear command associated with the first module, a bus interface configured to supply the interrupt clear commands to the first module, and a priority determination unit located between the status register and the processor and configured to select information having a highest interrupt priority among the interrupt status information and supply the selected information to the processor.

In still other embodiments, the bus interface is a bus slave interface with respect to the processor and is a bus master interface with respect to the plurality of modules.

In even other embodiments, the processor is configured to operate faster than the plurality of modules.

BRIEF DESCRIPTION OF THE DRAWINGS

The accompanying drawings are included to provide a further understanding of inventive concepts, and are incorporated in and constitute a part of this specification. The drawings illustrate example embodiments of inventive concepts and, together with the description, serve to explain principles of inventive concepts. In the drawings.

DETAILED DESCRIPTION OF EXAMPLE EMBODIMENTS

Example embodiments of inventive concepts will be described with reference to accompanying drawings.

Although a few example embodiments of inventive concepts are shown and described, it would be appreciated by those of ordinary skill in the art that changes may be made in these example embodiments without departing from the principles and spirit of example embodiments, the scope of which is defined in the claims and their equivalents.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Like numbers refer to like elements throughout. As used herein, the terra "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Example embodiments of inventive concepts are described herein with reference to cross-section illustrations that are schematic illustrations of example embodiments (and intermediate structures) of inventive concepts. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing.

Figure 1:
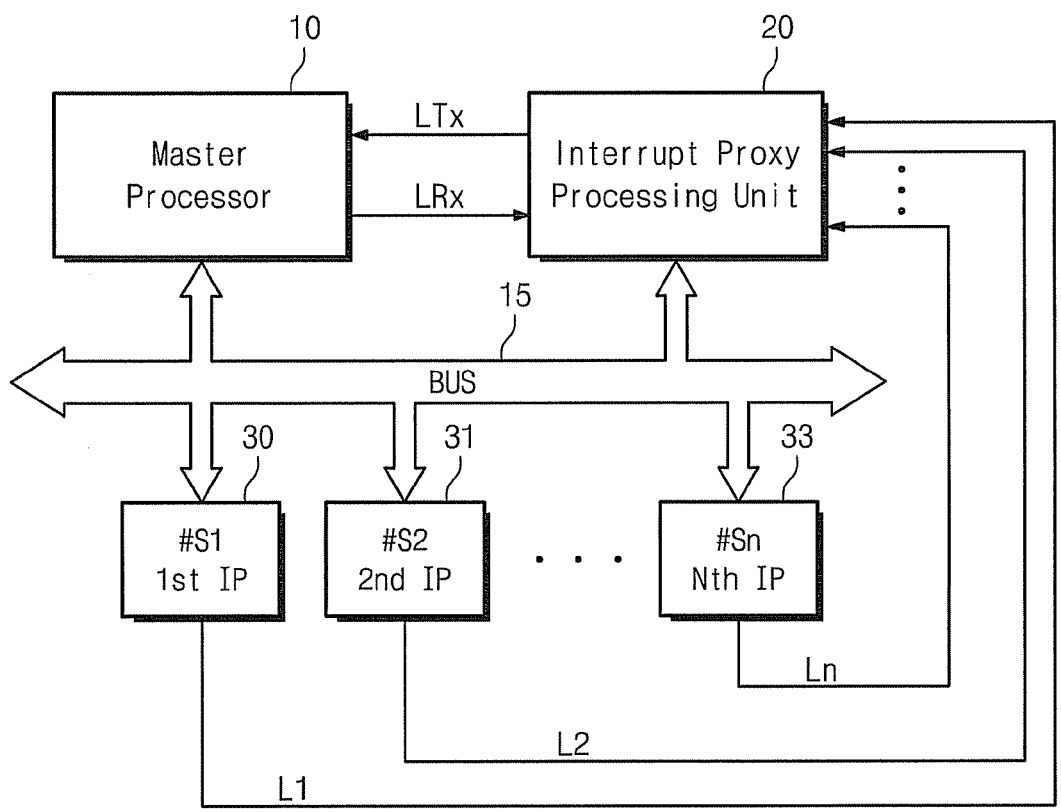
FIG. 1 is a schematic block diagram of a system on chip (SoC) according to an example embodiment of inventive concepts.
Figure 2:
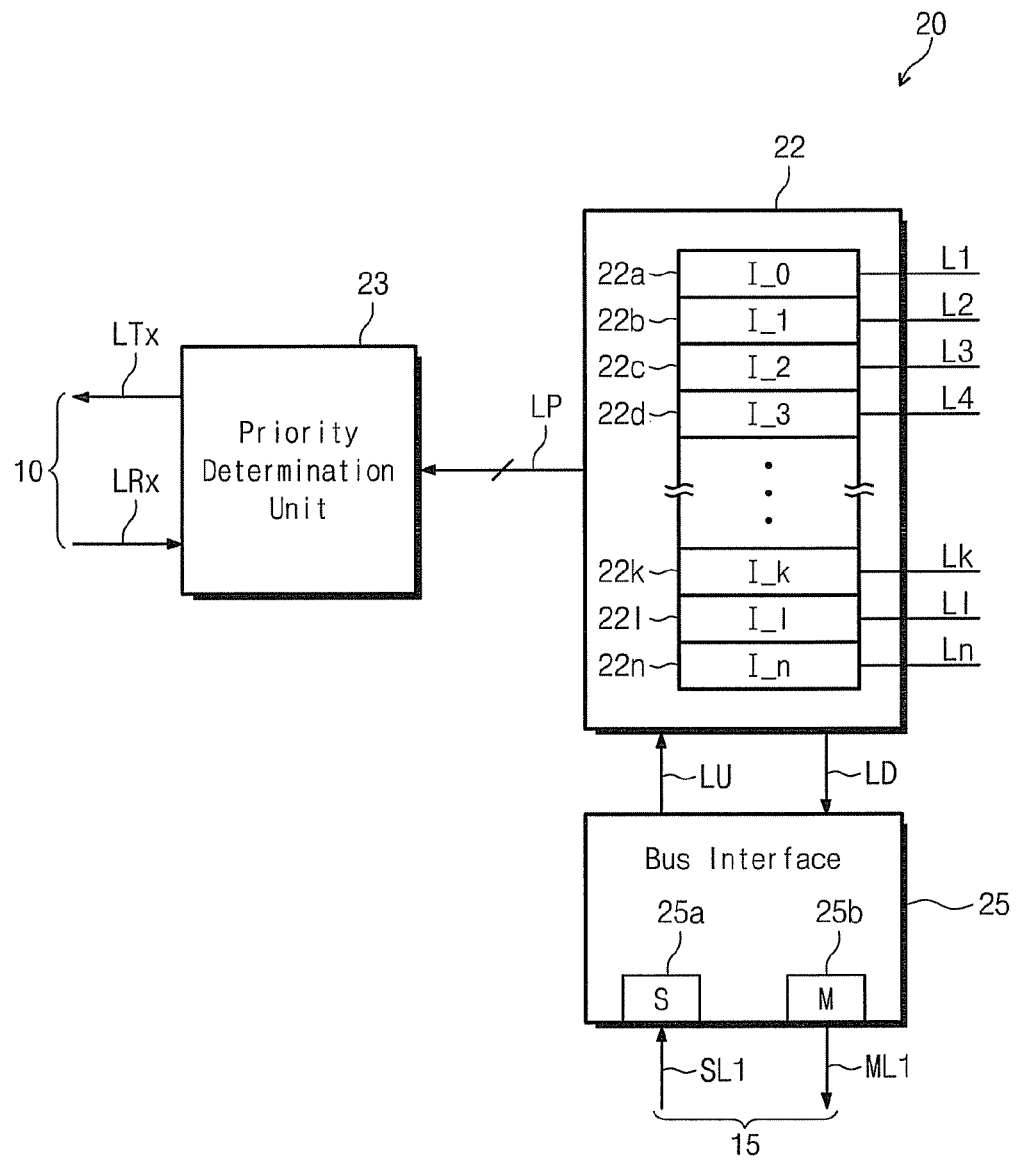
FIG. 2 is a detailed block diagram showing an example structure of an interrupt proxy processing unit of FIG. 1.
Figure 3:
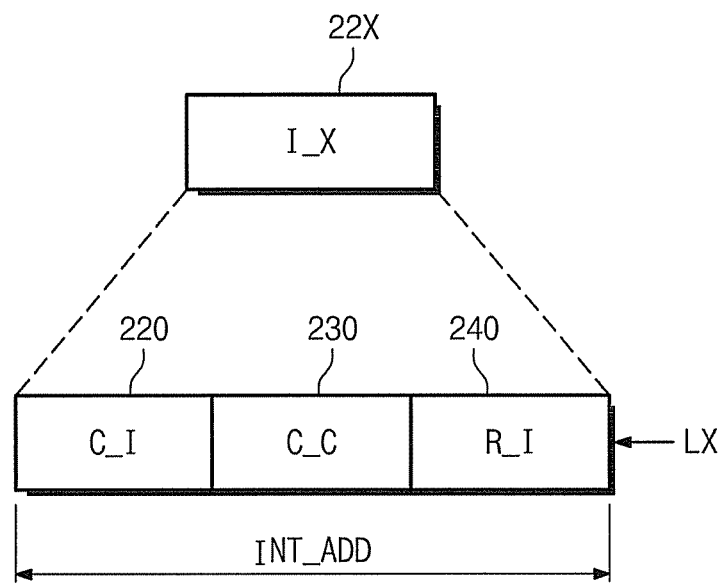
FIG. 3 is a view showing unit storage regions of a status register related to FIG. 2.

FIG. 1 is a schematic block diagram of a system on chip (SoC) according to an example embodiment of inventive concepts. FIG. 2 is a detailed block diagram showing an exemplary structure of an interrupt proxy processing unit 20 shown in FIG. 1. FIG. 3 is a view showing unit storage regions of a status register related to FIG. 2.

Referring to FIG. 1, the SoC includes a master processor 10 functioning as a processor core, an interrupt proxy processing unit 20, a bus 15 functioning as a system bus, and first to n-th intellectual properties (IPs)(may be referred to as modules) 30, 31, and 33 which are connected to the bus 15.

The master processor 10, as a processor core, processes a set task according to request by the SoC. A microprocessor may be used as the master processor 10.

The first to n-th IPs 30, 31, and 33 are installed on the SoC in the form of a module and operationally associated with the processor core through the bus 15. The first to n-th IPs may include at least one selected from the group consisting of a memory, a logic circuit, an analog circuit, and a digital signal processor (DSP).

The interrupt proxy processing unit 20, being connected to the master processor 10 and the first to n-th IPs 30, 31, and 33, stores interrupt status information applied from the first to n-th IPs 30, 31, and 33 and solely processes an interrupt release task with respect to the first to n-th IPs 30, 31, and 33.

FIG. 2 shows the structure of the interrupt proxy processing unit 20 in detail. Referring to FIG. 2, the interrupt proxy processing unit 20 includes a status register 22, a bus interface 25, and a priority determination unit 23.

The status register 22 stores the interrupt status information according to corresponding IPs and, when the interrupt is released, stores interrupt release signals applied from the master processor 10 according to corresponding IPs.

The bus interface 25 is connected with the status register 22 through lines LU and LD and supplies the interrupt release signals stored in the status register 22 to a corresponding IP among the plurality of IPs. The bus interface 25 may include a slave interface unit 25a and a master interface unit 25b. A virtual component interface (VCI) may be used as an interface of the bus interface 25. The VCI, as standard interface and protocol for communication among VCs, defines a standard interface between a VC and a system bus in designing an SoC.

The priority determination unit 23 connected to the status register 22 through a connection line LP is located between the status register 22 and the master processor 10. The priority determination unit 23 selects information having a highest interrupt priority among the interrupt status information and supplies the selected information to the master processor 10, that is, the processor core.

The status register 22 consists of a plurality of unit storage regions 22a, 22b, 22n which correspond to the first to n-th IPs 30, 31, and 33. The unit storage regions 22a, 22b, 22n are connected to the first to n-th IPs 30, 31, and 33 (FIG. 1) through lines L1 to Ln, respectively.

As shown in FIG. 3, one unit storage region 22x (x: 'a' to 'n'), for example, may include a first storage region 240, a second storage region 230, and a third storage region 220.

Referring to FIG. 3, the first storage region 240 denoted by R-I may store the interrupt status information.

The second storage region 230 denoted by C-C may store the interrupt release signals.

The third storage region 220 denoted by C-I may store transmission execution information regarding the interrupt status information.

The interrupt proxy processing unit 20 shown in FIG. 2, being provided to improve the performance and the operational stability of the SoC, stores the interrupt status information applied from the first to n-th IPs 30, 31, and 33 in the status register 22. Therefore, a shadow copy of the interrupt status information generated from the first to n-th IPs 30, 31, and 33 may be stored in the status register 22. The interrupt proxy processing unit 20 applies a highest-priority interrupt among the generated interrupts to the master processor 10 through a line LTx of FIG. 1. Accordingly, the master processor 10 processes the interrupt task related to the corresponding IP. Here, an operation of checking release of the interrupt is excluded from the interrupt task. The master processor 10 applies an interrupt clear command that commands release of the interrupt through a line LRx (FIG. 1) and then immediately escapes an interrupt service routine without confirming the release of the interrupt of the corresponding IP. In other words, the master processor 10 rapidly stops the interrupt processing operation and returns to a normal operation mode.

According to the interrupt clear command, the interrupt proxy processing unit 20 solely processes the interrupt release task with respect to the corresponding IP.

If the master processor 10 is thus able to release the interrupt of the IP through the interrupt proxy processing unit 20 without making direct access to the corresponding IP, time taken for releasing the interrupt signal may be standardized, resulting in improvement of the performance of the whole system. In addition, the master processor 10 may process a requested task by making access to another IP while not performing the release of the interrupt. Furthermore, in case that difference in operation speed between the master processor 10 and a specific IP is remarkable, reentry of the master processor 10 into the interrupt service routine may be prevented.

The interrupt proxy processing unit 20 may be another single IP operating as a bus master connected to the system bus 15. The interrupt proxy processing unit 20 may also operate as a bus slave connected to the system bus 15 to enable access of the master processor 10 thereto.

When the master processor 10 is not using the system bus 15, the interrupt proxy processing unit 20 may frequently read in the interrupt status of the respective IPs like a direct memory access (DMA) controller and store the shadow copy of the interrupt status information. The interrupt proxy processing unit 20 may perform the above function through only the lines LTx and LRx of FIG. 1 without having to use the system bus 15.

Hereinafter, the interrupt task processing operation will be explained with reference to FIGS. 1 to 3, presuming that an interrupt is generated in the n-th IP 33 among the first to n-th IPs 30, 31, and 33.

When the interrupt is generated in the n-th IP 33, the interrupt proxy processing unit 20 stores the interrupt status information in the first storage region 240 of FIG. 3 through a line Ln. When it is determined by the priority determination unit 23 that the interrupt generated in the n-th IP 33 is to be transmitted, the interrupt proxy processing unit 20 is applied with interrupt transmission execution information that notifies generation of the interrupt through the line LTx or the system bus 5. In this case, transmission execution information that notifies completion of the transmission is stored in the third storage region 220 shown in FIG. 3.

Accordingly, the master processor 10 applies the interrupt clear command for release of the interrupt to the interrupt proxy processing unit 20 through the line LRx of FIG. 1 or the system bus 15, while processing the interrupt task regarding the corresponding IP simultaneously. Upon application of the interrupt clear command, the master processor 10 escapes the interrupt service routine without confirming that the interrupt of the corresponding IP is released.

From this time, the interrupt proxy processing unit 20 solely performs the interrupt release task regarding the corresponding IP. The interrupt clear command is stored in the second storage region 230 of the interrupt proxy processing unit 20. In this state, the interrupt proxy processing unit 20 does not transmit the transmission execution information of the corresponding IP 33 to the master processor 10 any more. The interrupt clear command stored in the second storage region 230 is applied as an interrupt release signal to the n-th IP 33 through a master line MU which belongs to the system bus of the master interface unit 25b of FIG. 3. Here, the interrupt proxy processing unit 20 may achieve access to the n-th IP 33 by using an internal address INT_ADD.

When the interrupt related to the n-th IP 33 is released, a storage state of the first storage region 240 is reset to a default state, resulting in a default state of the third storage region 220 as well. When the storage states of the first and third storage regions 240 and 220 are equalized, a storage state of the second storage region 230 is also reset to the default state. Such default states of the first to third storage regions 240, 230, and 220 are maintained until the next time an interrupt is generated in the corresponding IP.

Therefore, the processor core which is the master processor 10 may be able to escape the interrupt service routine immediately without having to confirm that the interrupt of the corresponding IP is normally released.

As described above, according to example embodiments of inventive concepts, an interrupt proxy processing unit may be prevented from waiting in an interrupt processing routine or reentering an interrupt service routine due to its own operational characteristic. Therefore, interrupt tasks requested by respective IPs may be processed quickly and, furthermore, in uniform time in a standardized manner. As a result, since load applied to a processor core for processing the interrupt is reduced, the processor core is able to process more tasks. Accordingly, the overall performance of the SoC may be improved.

Although example embodiments have been explained about an SoC having a processor core, the scope of inventive concepts may be applied to embedded systems, not limited to example embodiments.

The above-disclosed subject matter is to be considered illustrative and not restrictive, and the appended claims are intended to cover all such modifications, enhancements, and other embodiments, which fall within the true spirit and scope of inventive concepts. For example, the circuit structure of the interrupt proxy processing unit, or the arrangement and structures of circuit blocks connected to the interrupt proxy processing unit may be variously changed or modified within the spirit and scope of inventive concepts.

What is claimed is:

1. A system on chip (SoC) comprising:
a processor configured to process a task;
a system bus;
a plurality of modules operationally coupled to the processor through the system bus;
an interrupt proxy processing unit operationally coupled to the processor and the plurality of modules, and the interrupt proxy processing unit configured to solely process an interrupt-related task associated with a first module of the plurality of modules, wherein the interrupt proxy processing unit is configured to release an interrupt from the first module as part of the interrupt-related task and the interrupt proxy processing unit includes,
a status register configured to store interrupt status information regarding the interrupt received from the first module and store an interrupt release signal received from the processor if the processor releases the interrupt, the status register including,
a first storage region configured to store the interrupt status information,
a second storage region configured to store the interrupt release signal, and
a third storage region configured to store transmission execution information based on the interrupt status information;
a bus interface configured to supply the interrupt release signal to the first module; and
a priority determination unit between the status register and the processor, and the priority determination unit configured to select information having a highest interrupt priority among the interrupt status information and supply the selected information to the processor.

2. The SoC of claim 1, wherein the processor is not configured to directly supply the interrupt release signal to the first module.

3. The SoC of claim 1, wherein the bus interface is a bus slave interface with respect to the processor and is a bus master interface with respect to the plurality of modules.

4. A system on chip (SoC) comprising:
a processor configured to process a task;
a system bus;
a plurality of modules operationally coupled to the processor through the system bus; and
an interrupt proxy processing unit operationally coupled to the processor and the plurality of modules, and the interrupt proxy processing unit configured to receive an interrupt from a first module of the plurality of modules, store interrupt status information, and solely process an interrupt release task with respect to the first module, the interrupt proxy processing unit including,
a status register configured to store the interrupt status information and store an interrupt release signal received from the processor, the status register including,
a first storage region configured to store the interrupt status information,
a second storage region configured to store the interrupt release signal, and
a third storage region configured to store transmission execution information based on the interrupt status information;
a bus interface configured to supply the interrupt release signal to the first module; and
a priority determination unit between the status register and the processor, and the priority determination unit configured to select information having a highest interrupt priority among the interrupt status information and supply the selected information to the processor.

5. The SoC of claim 4, wherein the plurality of modules comprise at least one selected from the group consisting of a memory, a logic circuit, an analog circuit, and a digital signal processor (DSP).

6. The SoC of claim 4, wherein the processor is not configured to directly supply the interrupt release signal to the first module.

7. A method for processing interrupts in a system on chip (SoC), the SoC including a plurality of modules installed in the form of a module and operationally associated with a processor through a system bus, the method comprising:
storing interrupt status information generated from the plurality of modules in an interrupt proxy processing unit that operates as a slave interface with respect to the processor; and
releasing an interrupt through the interrupt proxy processing unit so that, when the processor escapes an interrupt processing operation mode, an operation of checking release of the interrupt is skipped, wherein
the interrupt proxy processing unit receives from the processor an interrupt clear command with respect to a corresponding module among the plurality of modules before the releasing of the interrupt,
the interrupt status information and the interrupt clear command are stored in a status register of the interrupt proxy processing unit,
the interrupt status information is stored in a first storage region of the status register,
the interrupt clear command is stored in a second storage region of the status register, and
the status register further includes a third storage region to store transmission execution information regarding the interrupt status information.

8. The method of claim 7, wherein the transmission execution information is stored when selected as information having a highest interrupt priority among the interrupt status information.

9. A system on chip (SoC) comprising:
a processor configured to process a task;
a system bus;
a plurality of modules including hardware, peripheral devices, and interfaces, and the plurality of modules operationally coupled to the processor through the system bus; and
an interrupt proxy processing unit operationally coupled to the plurality of modules, the interrupt proxy processing unit configured to operate as another module with respect to the processor, receive an interrupt from a first module of the plurality of modules, store interrupt status information, and solely release the interrupt with respect to the first module upon receiving an interrupt clear command from the processor, wherein the interrupt proxy processing unit includes,
a status register configured to store the interrupt status information regarding the interrupt and store the interrupt clear command, the interrupt clear command associated with the first module, the status register including,
a first storage region configured to store the interrupt status information,
a second storage region configured to store the interrupt release signal, and
a third storage region configured to store transmission execution information based on the interrupt status information;
a bus interface configured to supply the interrupt clear command to the first module; and
a priority determination unit located between the status register and the processor, and the priority determination unit configured to select information having a highest interrupt priority among the interrupt status information and supply the selected information to the processor.

10. The SoC of claim 9, wherein the processor is not configured to directly supply the interrupt clear command to the first module.

11. The SoC of claim 9, wherein the plurality of modules includes at least one selected from the group consisting of a memory, a logic circuit, an analog circuit, and a digital signal processor (DSP).

12. The SoC of claim 9, wherein the bus interface is a bus slave interface with respect to the processor and is a bus master interface with respect to the plurality of modules.

13. The SoC of claim 9, wherein the processor is configured to operate faster than the plurality of modules.

* * * * *